United States Patent
Yasui et al.

(10) Patent No.: US 6,382,717 B1
(45) Date of Patent: May 7, 2002

(54) SHOCK ABSORPTION ARRANGEMENT IN SEAT BACK

(75) Inventors: Takashi Yasui; Katsumasa Shimizu, both of Akishima (JP)

(73) Assignee: Tachi-S Co., Ltd., Tokyo (JP)

(*) Notice: Subject to any disclaimer, the term of this patent is extended or adjusted under 35 U.S.C. 154(b) by 0 days.

(21) Appl. No.: 09/547,338

(22) Filed: Apr. 11, 2000

(51) Int. Cl.$^7$ .............. B60N 2/42; B60R 21/05
(52) U.S. Cl. .............. 297/216.13; 297/216.14; 297/378.12; 297/452.18; 297/463.1
(58) Field of Search .......... 297/216.13, 216.14, 297/378.12, 452.18, 463.1

(56) References Cited

U.S. PATENT DOCUMENTS

| | | | | |
|---|---|---|---|---|
| 3,528,703 A | * | 9/1970 | Ohta | 297/391 |
| 3,537,751 A | * | 11/1970 | Inoue et al. | 297/216.14 |
| 3,627,379 A | * | 12/1971 | Faust | 297/284.4 |
| 3,680,912 A | * | 8/1972 | Matsuura | 297/391 |
| 3,729,228 A | * | 4/1973 | Inoue et al. | 297/396 |
| 3,797,858 A | * | 3/1974 | Yamada | 280/751 |
| 4,350,389 A | * | 9/1982 | Parsson et al. | 297/410 |
| 4,544,204 A | * | 10/1985 | Schmale | 297/452.18 |
| 4,709,943 A | * | 12/1987 | Yoshimura et al. | 280/751 |
| 4,718,720 A | * | 1/1988 | Braun et al. | 297/216 |
| 4,991,907 A | * | 2/1991 | Tanaka | 297/408 |
| 5,322,347 A | * | 6/1994 | Takeda | 297/410 |
| 5,697,670 A | * | 12/1997 | Husted et al. | 297/216.13 |
| 5,882,072 A | * | 3/1999 | Morlock | 297/216.13 |
| 6,003,937 A | * | 12/1999 | Dutton et al. | 297/216.1 |
| 6,074,004 A | * | 6/2000 | Carmichael | 297/216.14 |

FOREIGN PATENT DOCUMENTS

| | | | |
|---|---|---|---|
| JP | 407177951 A | * | 7/1995 |
| JP | 8-11606 | | 1/1996 |
| JP | 411105603 A | * | 4/1999 |

* cited by examiner

*Primary Examiner*—Peter M. Cuomo
*Assistant Examiner*—Joseph Edell
(74) *Attorney, Agent, or Firm*—Browdy and Neimark, P.L.L.C.

(57) ABSTRACT

A shock absorption in a seat back of a seat, which is arranged in a bracket fixed on the seat back frame in the seat back and an operation lever attached to the bracket. In this arrangement, the bracket is formed such that upper and lateral wall regions are defined independently of each other, with a slit defined therebetween. The lower securing portion of the bracket, fixedly secured on the seat back frame, is relatively easy to bend forwardly relative to the seat back frame by an external load applied to the rearward side thereof. A stopper wire member, which has an abutment end portion, is provided over the vertical wall region of bracket and a part of the seat back frame, such that the abutment end portion is oriented toward the operation lever. Hence, the bracket is bendable forwardly by a great external load applied from the rear side of seat back frame, in which case, the operation lever in the bracket will be abutted against the abutment end portion of stopper wire member, causing both bracket and stopper wire member to bend forwardly, to thereby absorb a corresponding great shock.

14 Claims, 3 Drawing Sheets

SHOCK ABSORPTION ARRANGEMENT IN SEAT BACK

BACKGROUND OF INVENTION

1. Field of the Invention

The present invention relates to a shock absorption in a seat, which absorbs a shock to an occupant on the seat who hits against a part of the seat, and in particular to a shock absorption arrangement provided in a seat back of automotive seat having, provided on its top, a hard control element such as a bracket and lever for operation of a reclining device for adjustment in inclination of the seat back or a mechanism for folding an upper part of the seat back to a lower part of the same.

2. Description of Prior Art

Some of various automotive seats are provided with a control element in the seat back thereof for reclining purpose or for causing the upper part of the seat back to fold onto the lower part of the same in the foldable type of seat back. As indicated in FIG. 1, such control element typically comprises an operation lever (4') and a bracket (A') supporting the lever, all of which are disposed at the top of a seat back (SB) adjacent to its one corner. Designation (5) denotes a well known tubular seat back frame having an upper inverted-U-shaped frame section defined therein. The bracket (A') is formed from a sheet metal in a three-dimensional configuration having an integral securing portion (13'). As indicated by the phantom lines, this robust bracket (A') is firmly welded at its securing portion (13') upon the whole of one upper corner portion of such tubular seat back frame (5) which is embedded in the seat back (SB). The operation lever (4') is made of a hard metallic material and movably supported in the bracket (A') and may be operatively connected via a cable (3) with a reclining device (E) or with a mechanisms (D) for causing the upper part (SB1) of the seat back (SB) to fold toward the lower part (SB2) of the same. An occupant on the seat (S) can therefore operate the lever (4') to incline either of the seat back (SB) and its upper part (SB1), as required.

In the foregoing known arrangement, however, it is of much likelihood that a passenger sifting on a rear seat behind the seat (S) (at R) will hit at his or her head against such very hard elements as the lever (4') and bracket (A') in a collision case or the like, raising a dangerous and injury problem.

Conventionally, to solve that problem, several kinds of shock absorption materials have been used and provided in the upholstery or a foam padding layer of the seat back (SB) to surround both lever (4') and bracket (A') so as to protect the head of an occupant on the rear seat against serious damage and injury. Also, as the seat back frame (5) itself is increasingly very hard due to various reinforcing elements provided thereto, several shock absorption arrangements have been added in the seat back frame for protection of the rear-seat passenger. But, such shock absorption has been found defective in rendering much complicated the structure of seat back, which requires troublesome and time-consuming steps in assembling the seat back and also high amount of costs involved.

SUMMARY OF THE INVENTION

In view of the above-stated drawbacks, it is therefore a purpose of the present invention to provide an improved shock absorption arrangement in the seat back of a seat, which permits direct use of the original parts of conventional bracket and lever, and effectively absorbs a shock to a person who hits his or her head thereagainst.

To achieve such purpose, in a known tubular seat back frame of a generally inverted "U" shape, with a bracket fixed on one curved corner thereof, the bracket having an operation lever movably provided therein, a shock absorption arrangement of the present invention is basically comprised of:

a main wall region defined in the bracket, the main wall region including a lateral side, an upper side and a lower side;

a lateral wall region so defined on the bracket as to extend from the lateral side of main wall region in a forward direction forwardly ion the seat back frame;

an upper wall region so defined in the bracket, independently of the lateral wall region, as to extend from the upper side of main wall region in the forward direction, the upper wall region having an opening formed therein, through which the operation lever passes;

a securing portion so defined in the bracket as to extend from the lower side of main wall region, the securing portion being fixed on the foregoing one curved corners at a side forwardly of the seat back; and a stopper means fixedly provided on and over the lateral wall region and a forward part of the seat back frame, the stopper means including an abutment end portion oriented toward said operation lever, wherein said abutment end portion is so adapted that, when the bracket is deformed and bent in a forward direction by an external load applied thereto from the rearward side of seat back frame, the operation lever is abutted against the abutment end portion.

Accordingly, this arrangement can be simply constructed by directly using the conventional bracket with operation lever, at low costs. Also, if, for instance, the head of a person is hit against the bracket and lever, the whole of bracket is bent at its securing portion in the forward direction with respect to the seat back frame, thereby avoiding a direct serious impact on the head of person. Further, at this moment, the operation lever is quickly abutted against the abutment end portion of stopper means, whereby there is established a straight passage between the lever and abutment end portion, through which passage, a part of the load exerted upon both main wall region and lever is positively transmitted to both horizontal and vertical wire sections of stopper wire member. On the other hand, another part of the load, exerted on the lateral wall section, is transmitted to the vertical wire section. Consequently, if the load exceeds the rigidity of that vertical wire section, the whole of bracket is bent together with the vertical wire section forwardly relative to the seat back frame, thereby absorbing most of the impact of load.

Preferably, the stopper means may further include a first portion welded along the lateral wall region and a second portion extending from the first portion on a generally horizontal line to a point within the bracket.

The stopper means may comprise a wire member which is so formed as to define therein: a lower wire portion welded on a forward part of the seat back frame; a vertical wire portion welded on and along the lateral wall region in a generally vertical direction; and a horizontal wire portion extending from the vertical wire portion on a generally horizontal line, the horizontal wire portion terminating in the abovementioned abutment end portion within the bracket, wherein the abutment end portion is in turn oriented therefrom toward the operation lever in a direction orthogonal therewith, with a spacing provided between the abutment end portion and operation lever. The rigidity of this wire member is set to such a predetermined degree that withstands a certain normal load and only allows the wire member to be bendable by a great excessive load (L) which is applied in excess of its rigidity from the human's head or body to both lever (4) and bracket (A).

Preferably, an opening may be formed in the securing portion so as to increase its bendability with respect to the seat back frame.

Other advantages and features of the present invention will become apparent from reading of the descriptions hereinafter, with reference to the annexed drawings.

DETAILED DESCRIPTION OF PREFERRED EMBODIMENT OF THE INVENTION

Referring to FIGS. 2 to 5, one exemplary mode of shock absorption means in the present invention is illustrated, which is generally designated by (X). It should be first understood that this is an improvement based on the conventional structure of seat back frame (5) which has been described earlier with reference to FIG. 1, and in particular concerned with the conventional lever (4') and bracket (A') fixed on seat back frame (5). Thus, the present invention utilizes the seat back frame (5) and seat (S) shown in FIG. 1, and further offers a novel improvement in light of the conventional arrangement of lever (4') and bracket (A'), as will be described in detail. Any further specific description about the common parts and elements is therefore deleted for the sake of simplicity, and all like designations to be used hereinafter correspond to all like designations given in the preceding prior-art description and FIG. 1.

Figure 2:
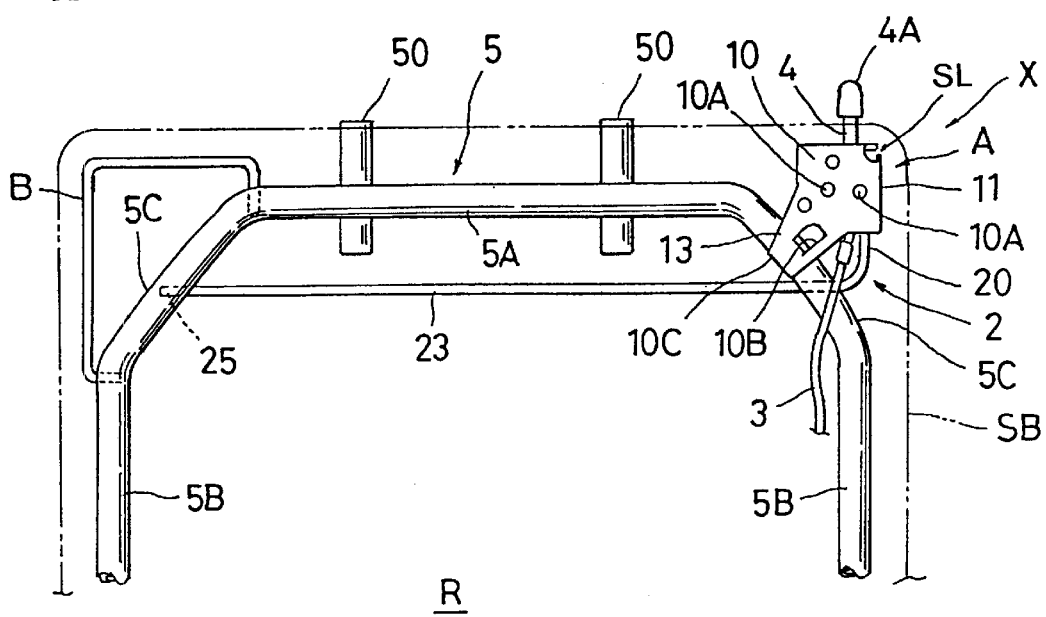
FIG. 2 is a partly broken back elevation view of a seat back frame provided with a shock absorption arrangement in accordance with the present invention.

FIG. 2 shows the upper frame region of seat back frame (5) which is formed by bending a tubular material in a generally inverted-U-shaped configuration as known in the art, having an upper horizontal frame section (5A) and a pair of vertical lateral frame sections (5B). Also, as normally found in known seat back frameworks, a pair of inclined corners (5C) are defined in this upper frame region of seat back frame (5) and a pair of headrest stay holders (50) are fixed on the upper horizontal frame section (5A).

In accordance with the present invention, the shock absorption means (X) is provided at one of the two inclined corners (5C) (on the right side as viewed from FIG. 2) of the seat back frame (5). Otherwise stated, the shock absorption means (X) is arranged at the one corner (5C) of seat back frame (5), using both of the previously stated operation lever (4') and bracket (A'). Namely, by way of a most preferred mode, such means (X) may be embodied by a partly improved mode of bracket (A) in which an operation lever (4) is supported and a stopper wire member (2) disposed at that one seat back frame corner (5C), as can be seen in FIG. 2. Designation (B) denotes a generally L-shaped shock absorber wire fixed on another of the two corners (5C).

Figure 1:
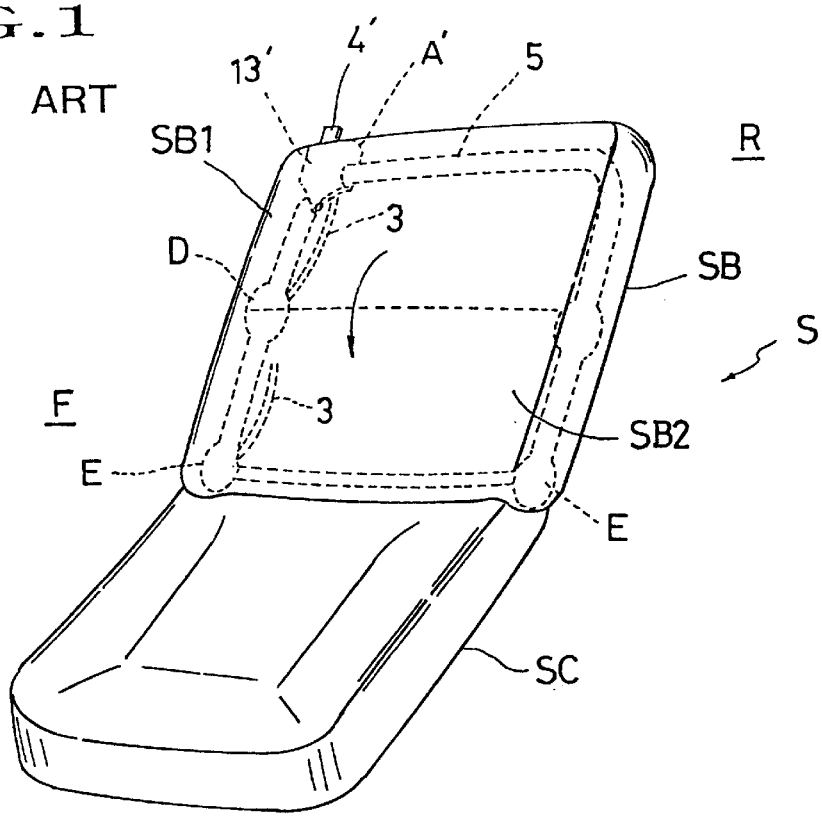
FIG. 1 schematic perspective view of an automotive seat having a seat back in which a conventional bracket is fixed on its seat back frame, with an operation lever provided in the bracket for operation of a reclining device and a mechanism for causing the upper part of seat back to fold toward the lower part of the same.
Figure 3:
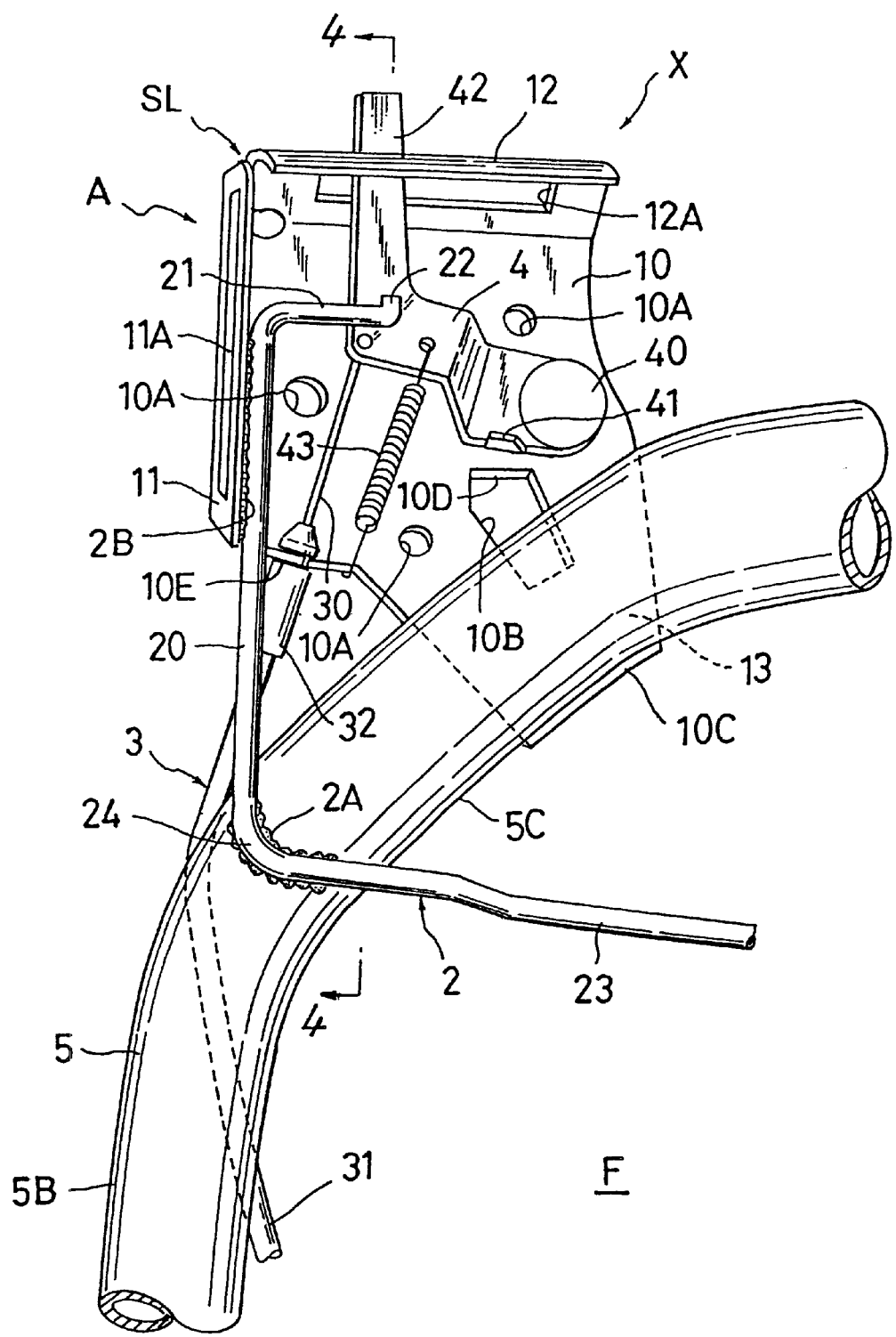
FIG. 3 is a fragmentary front view of a principal part of the present invention.
Figure 4:
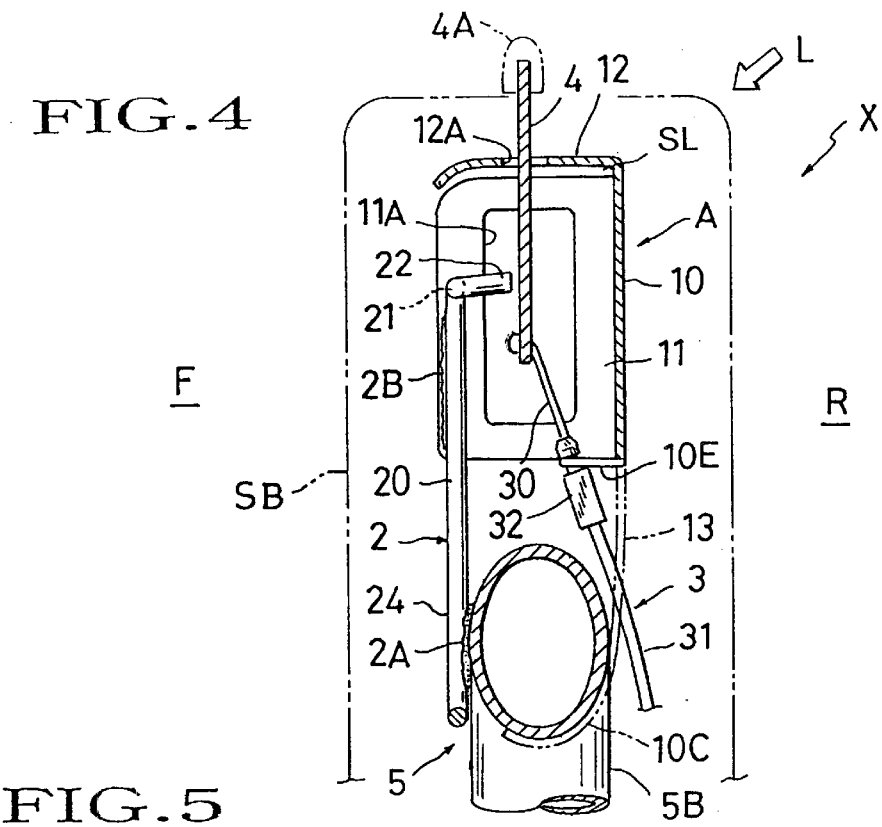
FIG. 4 is a sectional view taken along the line 4—4 in the FIG. 3.
Figure 5:
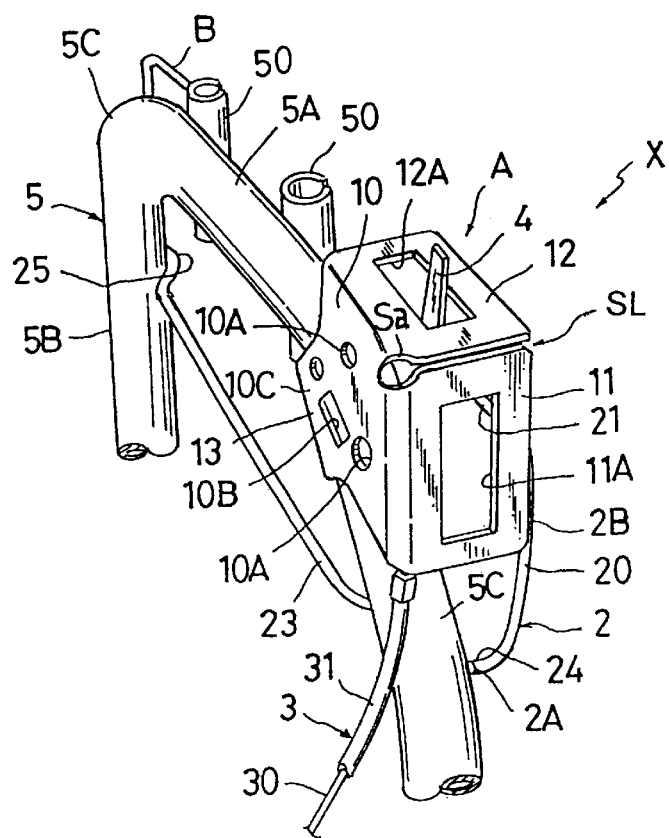
FIG. 5 is a partly broken, schematic perspective view of a principal part of the present invention, as viewed from the rear side thereof.

With further reference to FIGS. 3 to 5, in this particular mode, the bracket (A) is formed by cutting a known robust bracket (e.g. the bracket (A') in FIG. 1) such that there are defined a relatively narrow securing portion (13), a main wall region (10), one lateral wall region (11) and one upperwall region (12). More specifically, in this bracket (A), both lateral and upper wall regions (11)(12) are cut apart from each other to provide a slit (S) therebetween and they extend continuously from the main wall region (10) by a right angle, independently of each other. Designation (Sa) stands for a circular region formed in such slit (S) at the corner juncture among the three wall regions (10, 11, 12). Accordingly, the three wall regions (10)(11)(12) are pronouncedly divided by those slit (S) and circular region (Sa) such as to assume a substantially independent three sides of the bracket (A). In particular, the lateral and upper wall regions (11)(12) are each to receive an external load applied thereto, so that they are deformable or collapsible by the load, independently of each other.

Also, continuously extended downwards from the main wall region (10) is the securing portion (13) which lies coplanar therewith and terminates in an upturned securing end portion (10C) adapted for fixation to the round surface of tubular seat back frame corner (5C). This securing portion (13) is formed smaller in width than the prior-art one (13') by cutting and reducing the corresponding part, so that the bracket (A) is relatively easy to bend relative to the slant corner (5C) of seat back frame (5).

In accordance with the present invention, further formed respectively in the lateral and upper wall regions (11)(12) are two generally rectangular openings (11A) and (12A), thereby rendering each of the two wall regions (11)(12) more easily deformable or collapsible by an external load being applied in the corresponding direction. The opening (12A) also allows free movement of the lever (4) therein. Still further formed in the securing portion (13) is a generally rectangular opening (10B) so as to make it bendable easier by an external load applied thereto in a direction to the forward side (F), which means that the bracket (A) as a whole is relatively easy to bend at that securing portion (13) relative to the seat back frame corner (5C) in the forward direction.

Preferably, plural small circular openings (10A) may be formed in the main wall region (10) as illustrated, to make this particular planar wall region relatively easy to deform in the case of an external load being applied thereto. This arrangement also reduces the weight of bracket (A) as an additional advantageous aspect.

By being welded at its upturned securing end portion (10C) on the seat back frame corner (5C), the above-constructed bracket (A) is fixedly attached on the seat back frame (5) such that both outer surfaces of the main wall region (10) and securing portion (13) thereof face toward the rearward side (R) of the seat back frame (5), while by contrast, the upper and lateral wall regions (11)(12) thereof are oriented toward the forward side (F) of the seat back (5). It should be noted here that, in all the figures, the character (F) stands for the forward side with respect to the seat back frame (5), which is indicative of a forward running direction of an automobile or the side where an occupant can sit on the seat (S), whereas the character (R) for the rearward side with respect to the seat back frame (5), indicative of the side therebehind where a rear seat can be located, as understandable from FIG. 1. Preferably, in the securing portion (13), the rectangular opening (10B) may be so elongated to extend its length enough to overlay the seat back frame corner (5C), as best seen in FIG. 3, with a view to increasing the bendability of the securing portion (13) per se.

In the bracket (A), the operation lever (4) is attached such that its base end portion is rotatably pivoted at (40) on the inward side of the main wall region (10) and its another free end portion (42) passes through the opening (12A) of the upper wall region (12). Thus, the free end portion (42) is exposed externally of the bracket (A) and accessible from a user. As best seen in FIG. 3, the lever (4) is normally biased by a spring (43) to a locked position and connected with a cable (30) covered with a sheath (31), the cable (30) being connected to a reclining device or a mechanism for folding the upper part of seat back as in FIG. 1, although not clearly shown. The cable (30) is secured at its fitting (32) to an inwardly projected lug (10E) of the bracket (A). Designators (41) and (10D) denote a stopper lug of the lever (4) and an engagement edge of the opening (10B), respectively. The lever (4) is restricted in its movement by engagement of the stopper lug (41) with the edge (10D), but any further explanation thereabout is omitted as it is not a principal part of the invention.

With regard to the stopper wire member (2), a part of the shock absorption means (X) stated above, it is so arranged at the forward side (F) as to extend over both seat back frame corner (5C) and bracket (A). As best depicted in FIGS. 3 and 4, this stopper wire member (2) is fixed at its lower curved corner (24), by welding (2A), upon a local part of the seat back frame corner (5C) which faces toward the forward side (F), while being also at its vertical wire section (20) welded (at 2B) along the lateral wall region (11) of bracket (A) in the vertical wire direction thereof. The wire member (2) further includes a free end or abutment end portion (22) which is oriented toward the lever (4) within the bracket (A). The abutment end portion (22) is so adapted that the lever (4) is to be abutted thereagainst when the bracket (A) is deformed and bent towards the forward side (F) by an external load, as will be describe later. But, as seen in FIG. 4, the abutment end portion (22) is disposed at a point spaced from the lever (4), out of its way, normally allowing the lever to be freely rotated about the pin (40) in locking and unlocking direction. More specifically, the stopper wire member (2) is formed by being bent in the illustrated fashion, which has, defined therein, a lower horizontal wire section (23), the foresaid vertical wire section (20), an upper horizontal wire section (21), and the foresaid abutment ends portion (22), with the lower curved corner (24) defined between the lower horizontal and vertical wire sections (23)(20). The upper horizontal wire section (21) extends from the vertical wire section (20) by right angle, projecting horizontally inside the bracket (A) to a predetermined point terminating in the abutment end portion (22), at which the lever (4) lies. The abutment end portion (22) is defined by being bent by a right angle from the upper horizontal wire section (21) in a direction to the rearward side (R), i.e. a direction to orthogonally intersect the flat plane of lever (4), such as to project a small amount toward the lever (4), while maintaining a spaced-apart relation therewith as stated earlier. The lower horizontal wire section (23) is shown in FIG. 2 as being connected between the two lateral frame sections (5B) of seat back frame (5).

As indicated by the two-dot chain lines, an upholstery (e.g. a covering material and a foam padding) is affixed over the shock absorption means (A and 2) and seat back frame (5) to constitute a seat back (SB). Only the upper end portion (42) of lever (4) is exposed outwardly from the top of seat back (SB). It is covered with a cap (4A) of soft synthetic resin material for additional shock absorbing purpose.

With the above-described arrangement, when the head of a person sitting on a rear seat (not shown) at the rearward side (R) is hit seriously against the bracket (A) in a collision case or the like, it then follows that a corresponding great load (L) is applied in a downwardly inclined forward direction, as indicated by the arrow in FIG. 4, toward the top of seat back (SB), giving a large impact to both upper and main wall regions (12)(10) of bracket (A), including the lever (4). In that instance, while the upper wall region (12) is being deformed downwards, the whole of bracket (A) is bent at its securing portion (13) toward the forward side (F) with respect to the seat back frame (5). At this moment, the lever (4) is quickly abutted against the abutment end portion (22) of stopper wire member (2), so that both of those lever (4) and end portion (22) are brought in a firm contact with each other. Since the abutment end portion (22) itself projects in the orthogonal direction with the lever (4), having a rigidity enough to withstand the directly applied load (L), there is established a non-deformed straight passage between the lever (4) and that end portion (22), through which passage, a part of the load (L), exerted upon both main wall region (10) and lever (4), is positively transmitted to both horizontal and vertical wire sections (21)(20) of stopper wire member (2). On the other hand, another part of the load (L), exerted on the lateral wall section (11), is transmitted to the vertical wire section (20). Consequently, in the event that the load (L) exceeds the rigidity of that vertical wire section (20), the whole of bracket (A) is bent together with the vertical wire section (20) towards the forward side (F) relative to the seat back frame (5), thereby absorbing most of the impact of load (L). In this regard, the rigidity of support wire member (2) is set to such a predetermined degree that withstands a certain normal load and only allows the wire member (2) to be bendable by a great excessive load (L) which is applied in excess of its rigidity from the human's head or body to both lever (4) and bracket (A). It is therefore appreciated that, when the head of a person is hardly hit against the bracket (A) in an emergency case, the bracket (A), to which a corresponding forward great load (at L) is applied, is quickly deformed and bent in the forward direction. This is due to the provision of three independent wall regions (10, 11 and 12), bendable securing portion (13) and plural openings (10A, 10B, 11A, 12A) in the bracket (A). At this moment, of course, the thus-bent bracket (A) is received and blocked by the abutment end portion (22) and vertical wire section (20) of wire stopper member (2) against further deformation and bending of bracket (A), while escaping a part of the load (L) via the stopper wire member (2) per se to absorb the shock. But, if the load (L) exceeds the rigidity of the vertical wire portion (20) of stopper wire member (2), then the bracket (A) and vertical wire portion (20) are both bent in the forward direction (at F), hence providing a shock absorption to alleviate a serious shock that might be given to the person's head.

In accordance with the present invention, therefore, a effective shock absorption can be achieved by simply using the original part of conventional bracket and lever and only one wire member, which quite simplifies its structure with considerably low costs.

While having described the present invention as above, it should be finally understood that the invention is not limited to the illustrated embodiment, but any other modifications, replacements, and additions may structurally be applied thereto without departing from the scopes of the appended claims.

What is claimed is:

1. In a seat back of a seat, which has a seat back frame provided therein, said seat frame being formed in a generally inverted "U" shape from a tabular material with a pair of curved corners defined in the upper frame portion thereof, wherein a bracket is fixed on one of said pair of curved corners, said bracket having an operation lever movably provided therein, and wherein the seat back frame has forward and rearward sides, each being respectively defined forwardly and rearwardly of the seat back, a shock absorption arrangement comprising:
a main wall region defined in said bracket, said main wall region including a lateral side, an upper side and a lower side;
a lateral wall region so defined in said bracket as to extend from said lateral side of said main wall region in a direction to said forward side;
an upper wall region so defined in said bracket, independently of said lateral wall region, as to extend from said upper side of said main wall region in a direction toward said forward side, said upper wall region having an opening formed therein, through which said operation lever passes;
a securing portion so defined in said bracket as to extend from said lower side of the main wall region, said securing portion being fixed on said one of said pair of curved corners at a side facing toward said rearward side; and
a stopper means fixedly provided on and over said lateral wall region and a forward part of said seat back frame which faces toward said forward side, said stopper means including an abutment end portion oriented toward said operation lever, wherein said abutment end portion is arranged such that said operation lever is to be abutted thereagainst when said bracket is deformed and bent in a direction to said forward side by an external load applied thereto from said rearward side;
wherein said wire member has a rigidity, but is bendable by an external load applied thereto in excess of the rigidity.

2. In a seat back of a seat, which has a seat back frame provided therein, said seat back frame being formed in a generally inverted "U" shape from a tubular material, with a pair of curved corners defined in the upper frame portion thereof, wherein a bracket is fixed on one of said pair of curved corners, said bracket having an operation lever movably provided therein, and wherein the seat back frame has forward and rearward sides, each being respectively defined forwardly and rearwardly of the seat back, a shock absorption arrangement comprising:
a main wall region defined in said bracket, said main wall region including a lateral side, an upper side and a lower side;
a lateral wall region so defined in said bracket as to extend from said lateral side of said main wall region in a direction to said forward side;
an upper wall region so defined in said bracket, independently of said lateral wall region, as to extend from said upper side of said main wall region in a direction toward said forward side, said upper wall region having an opening formed therein, through which said operation lever passes;
a securing portion so defined in said bracket as to extend from said lower said of the main wall region, said securing portion being fixed on one of said pair of curved corners at a side facing toward said rearward side; and
a stopper means fixedly provided on and over said lateral wall region and a forward part of said seat back frame which faces toward said forward side, said stopper means including an abutment end portion oriented toward said operation lever, wherein said abutment end portion is arranged such that said operation lever is to be abutted thereagainst when said bracket is deformed and bent in a direction to said forward side by an external load applied thereto from said rearward side;
wherein said stopper means further includes a first portion welded along said lateral wall region and a second portion extending from said first portion on a generally horizontal line to a point within said bracket, and wherein said abutment end portion is defined at said point and spaced from said operation lever.

3. The shock absorption arrangement as defined in claim 2, wherein said main and lateral wall regions and said securing portion extend upwards from said seat back frame in a generally vertical direction thereof, wherein said stopper means comprises a wire member which is so formed as to define therein: a lower wire portion welded on said forward part of the seat back frame; a vertical wire portion welded on and along said lateral wall region in the generally vertical direction; and a horizontal wire portion extending from said vertical wire portion on a generally horizontal line, said horizontal wire portion terminating in said abutment end portion within said bracket, wherein said abutment end portion is in turn oriented therefrom toward said operation lever in a direction orthogonal therewith, and wherein a spacing is provided between said abutment end portion and said operation lever.

4. The shock absorption arrangement as defined in claim 2 wherein said upper end lateral wall regions are made independently by cutting them apart along a boundary therebetween to provide a slit there.

5. The shock absorption arrangement as defined in claim 2, wherein an opening is formed in said securing portion so as to increase a bendability of the securing portion with respect to said seat back frame.

6. The shock absorption arrangement as defined in claim 2, wherein an opening is formed in said lateral wall region so as to increase a deformability of the lateral wall region itself.

7. The shock absorption arrangement as defined in claim 2, wherein a plurality of openings are formed in said main wall region.

8. The shock absorption arrangement as defined in claim 2, wherein said main wall region has an inward surface facing toward said forward side and an outer surface facing toward said rearward side, wherein said operation lever is movably secured on said inward surface of the main wall region and wherein said abutment end portion of the stopper means is oriented toward said operation lever in a direction orthogonal therewith, with a spacing provided therebetween.

9. In a seat back of a seat, which has a seat back frame provided therein with a curved corner portion defined in an upper frame section of the seat back frame, wherein a bracket is fixed on said curved corner portion, said bracket having an operation lever movably provide therein, and wherein the seat back frame has forward and rearward sides, each being respectively defined forwardly and rearwardly of the seat back, a shock absorption arrangement comprising:
- a main wall region defined in said bracket, said main wall region including a lateral side, an upper side and a lower side;
- an upper wall region so defined in said bracket as to extend from said upper side of said main wall region in a direction to said forward side, said upper wall region having an opening formed therein, through which said operation lever passes;
- a securing portion so defined in said bracket as to extend from said lower side of the main wall region, said securing portion being fixed on said curved corner portion at a side facing toward said rearward side; and
- a stopper means fixedly provided on and over a forward part of said seat back frame which faces toward said forward side, said stopper means including a free end portion which is oriented to said operation lever in a spaced-apart relation therewith, so that, when said bracket is deformed and bent in a direction to said forward side by an external load applied thereto from said rearward side, said operation lever is brought into abutment against said free end portion of the stopper means.

10. The shock absorption arrangement as defined in claim 9, which, in addition to said main and upper wall regions and said securing portion, includes a lateral wall region so defined in said bracket as to extend from said lateral side of said main wall region in a direction to said forward side, wherein said upper wall region is defined independently of said lateral wall region, and wherein said stopper means is further fixedly provided on and over said lateral wall region, excepting said free end portion thereof oriented to said operation lever.

11. The shock absorption arrangement as defined in claim 10, wherein said stopper means further includes a first portion welded along said lateral wall region and a second portion extending from said first portion on a generally horizontal line to a point adjacent to said operation lever within said bracket, and wherein said second portion terminates in said free end portion which is disposed at said point and spaced from the operation lever.

12. The shock absorption arrangement as defined in claim 10 wherein said main and lateral wall regions and said securing portion extend upwardly from said seat back frame in a generally vertical direction thereof, wherein said stopper means comprises a wire member having, defined therein, a lower wire portion welded on said forward part of the seat back frame, a vertical wire portion welded on and along said lateral wall region in the generally vertical direction, and a horizontal wire portion extending from said vertical wire portion on a generally horizontal line, said horizontal wire portion terminating in said free end portion within said bracket, wherein said free end portion is in turn oriented from said horizontal wire portion toward said operation lever in a direction orthogonal therewith.

13. The shock absorption arrangement as defined in claim 9, wherein said main wall region and said securing portion extend upwardly from said seat back frame in a generally vertical direction thereof, wherein said stopper means comprises a wire member having, defined therein, a lower wire portion welded on said forward part of the seat back frame, a vertical wire portion welded on and along said lateral side of the main wall region in the generally vertical direction, and a horizontal wire portion extending from said vertical wire portion on a generally horizontal line, said horizontal wire portion terminating in said free end portion within said bracket, wherein said free end portion is in turn oriented from said horizontal wire portion toward said operation lever in a direction orthogonal therewith.

14. The shock absorption arrangement according to claim 13, wherein said wire member has a rigidity, but is bendable by an external load applied thereto in excess of the rigidity.

\* \* \* \* \*